United States Patent
Tsuji et al.

(10) Patent No.: US 8,284,010 B2
(45) Date of Patent: Oct. 9, 2012

(54) INDUCTOR AND DC-DC CONVERTER

(75) Inventors: Hitoshi Tsuji, Higashiomi (JP); Sadao Yamashita, Kyoto (JP); Takao Kakinoki, Soka (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/870,889

(22) Filed: Aug. 30, 2010

(65) Prior Publication Data

US 2011/0050191 A1 Mar. 3, 2011

(30) Foreign Application Priority Data

Aug. 31, 2009 (JP) ................................. 2009-199133

(51) Int. Cl.
*H01F 5/00* (2006.01)
*H01F 27/29* (2006.01)
*H01F 27/28* (2006.01)
*H01F 27/24* (2006.01)

(52) U.S. Cl. ........ 336/200; 336/192; 336/222; 336/232; 336/233

(58) Field of Classification Search .................. 336/200, 336/233, 222, 223, 232, 192
See application file for complete search history.

(56) References Cited

U.S. PATENT DOCUMENTS

| | | | |
|---|---|---|---|
| 4,639,708 A | | 1/1987 | Weatherly |
| 5,111,169 A | * | 5/1992 | Ikeda ............................ 333/181 |
| 5,529,831 A | | 6/1996 | Waga et al. |
| 5,962,840 A | * | 10/1999 | Haghiri-Tehrani et al. ... 235/492 |
| 6,097,273 A | * | 8/2000 | Frye et al. ...................... 336/200 |
| 6,114,938 A | * | 9/2000 | Iida et al. ....................... 336/200 |
| 6,380,821 B1 | * | 4/2002 | Imbornone et al. ............. 333/25 |
| 6,587,025 B2 | * | 7/2003 | Smith et al. .................... 336/200 |
| 6,683,510 B1 | * | 1/2004 | Padilla ............................. 333/25 |
| 7,262,684 B2 | * | 8/2007 | Conner et al. ............... 340/5.64 |
| 2001/0024739 A1 | | 9/2001 | Mizoguchi et al. |
| 2001/0028292 A1 | * | 10/2001 | Iida et al. ....................... 336/200 |

(Continued)

FOREIGN PATENT DOCUMENTS

CN 1357897 A 7/2002

(Continued)

OTHER PUBLICATIONS

Official Communication issued in corresponding Japanese Patent Application No. 2009-199133, mailed on Oct. 25, 2011.

*Primary Examiner* — Mohamad Musleh
*Assistant Examiner* — Mangtin Lian
(74) *Attorney, Agent, or Firm* — Keating & Bennett, LLP

(57) ABSTRACT

An inductor includes a coil electrode section in which a first spiral electrode and a second spiral electrode are wound in substantially the same direction, lie in substantially the same plane, and are connected to each other by a connection electrode. The coil electrode section is sandwiched by the first magnetic layer and the second magnetic layer from both directions substantially perpendicular to the plane. A first protrusion electrode and a second protrusion electrode at ends of the first spiral electrode and the second spiral electrode that are opposite to the connection electrode extend in a direction substantially perpendicular to the plane, have a length at which each of the protrusion electrodes protrudes from the first magnetic layer, and define opposite end electrodes of the inductor. Arranging this low-profile inductor on a mounting circuit board achieves a low-profile DC-DC converter including a two-layer structure.

9 Claims, 11 Drawing Sheets

U.S. PATENT DOCUMENTS

| | | |
|---|---|---|
| 2002/0070836 A1 | 6/2002 | Fujiyoshi et al. |
| 2004/0179383 A1 | 9/2004 | Edo et al. |
| 2006/0158301 A1* | 7/2006 | Shinkai et al. ............... 336/232 |
| 2006/0238273 A1 | 10/2006 | Tomonari et al. |

FOREIGN PATENT DOCUMENTS

| | | |
|---|---|---|
| CN | 1841579 A | 10/2006 |
| JP | 63-155606 U | 10/1988 |
| JP | 1-157507 A | 6/1989 |
| JP | 7-22241 A | 1/1995 |
| JP | 09-082525 A | 3/1997 |
| JP | 2001-143930 A | 5/2001 |
| JP | 2001-196226 A | 7/2001 |
| JP | 2001-244123 A | 9/2001 |
| JP | 2001-267155 A | 9/2001 |
| JP | 3410876 B2 | 5/2003 |
| JP | 2004-014837 A | 1/2004 |
| JP | 2004-343976 A | 12/2004 |
| JP | 2008-135430 A | 6/2008 |
| WO | 2007/069403 A1 | 6/2007 |

* cited by examiner

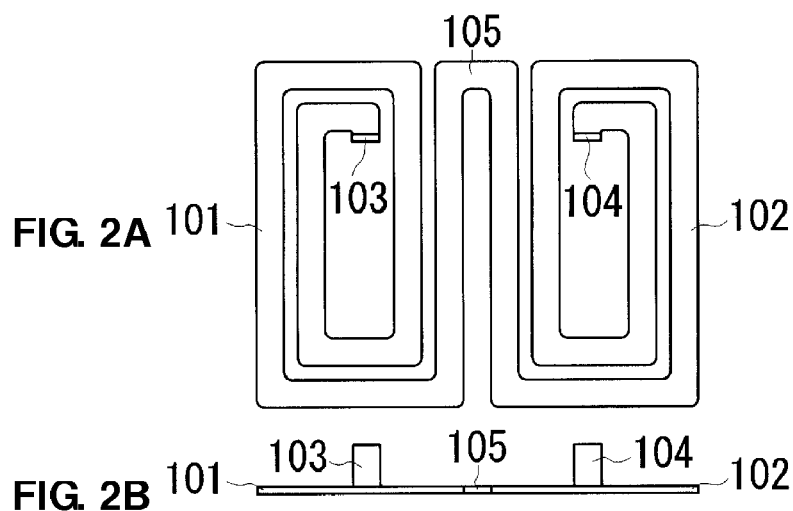
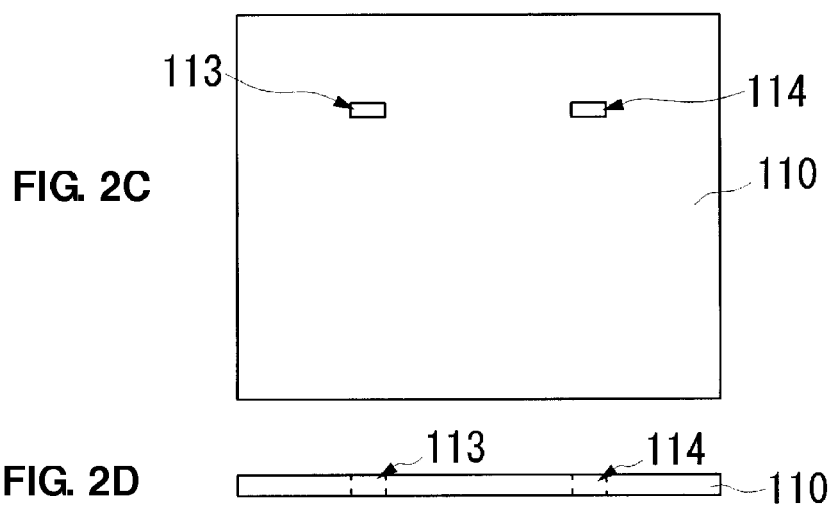
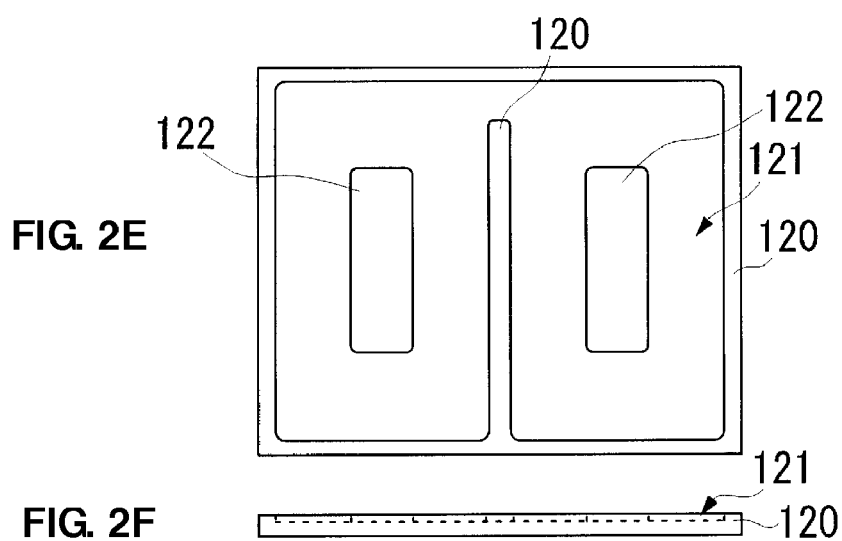

PLAN VIEW

B-B' CROSS-SECTIONAL VIEW

A-A' CROSS-SECTIONAL VIEW $Sv(110) = 2 \times (Svs(110) + Svt(110))$
$Sv(120) = 2 \times (Svs(120) + Svt(120))$

INDUCTOR AND DC-DC CONVERTER

BACKGROUND OF THE INVENTION

1. Field of the Invention

The present invention relates to an inductor and a DC-DC converter including the inductor.

2. Description of the Related Art

Nowadays, with miniaturization of an electronic device, a DC-DC converter used in the electronic device is also required to become smaller and reduce its profile. Because of this, an inductor of the DC-DC converter, the inductor needing a relatively large space, is required to become smaller and reduce its profile.

One example of such a small inductor is an inductor disclosed in Japanese Patent No. 3,410,876. The inductor includes a planar spiral coil, an insulating layer sandwiching the spiral coil from its opposite sides, and a magnetic layer sandwiching the insulating layer.

Another example is an inductor disclosed in Japanese Unexamined Patent Application Publication No. 1-157507. The inductor has a structure in which a spiral coil is disposed between neighboring layers of three insulating layers and a layer member made up of the spiral coils and the insulating layers is sandwiched between magnetic layers.

Unfortunately, for the inductors described in the above-mentioned patent documents, insulating layers are indispensable, and the insulating layers result in a limiting factor for a reduction in profile. With the inductors described in the above-mentioned patent documents, magnetic fields occurring in the plurality of spiral coils are combined, so if the magnetic layers are thin, magnetic saturation tends to occur and direct-current superimposition characteristics are poor. In particular, for an output inductor of a DC-DC converter, its load current may be large depending on the use; when the inductor tends to reach magnetic saturation, characteristics tends to degrade. Meanwhile, in order to make magnetic saturation less likely to occur and direct-current superimposition characteristics better, thick magnetic layers are necessary. This also results in a limiting factor for a reduction in profile.

SUMMARY OF THE INVENTION

Accordingly, preferred embodiments of the present invention provide a low-profile inductor that does not reach magnetic saturation and that has good direct-current superimposition characteristics even when being used in a situation in which load current is large, and also provide a small low-profile DC-DC converter that has good various characteristics by using such an inductor.

According to a preferred embodiment of the present invention, an inductor includes a coil electrode section and a magnetic layer section. The coil electrode section includes a first spiral electrode, a second spiral electrode lying in substantially the same plane as the first spiral electrode and wound in substantially the same direction as the first spiral electrode, a connection electrode arranged to connect an outer end of the second spiral electrode and an outer end of the first spiral electrode, a first protrusion electrode disposed at an inner end of the first spiral electrode and extending in a direction substantially perpendicular to the plane, and a second protrusion electrode disposed at an inner end of the second spiral electrode and extending in a direction substantially perpendicular to the plane. The first protrusion electrode and the second protrusion electrode define opposite end electrodes of the coil electrode section. The magnetic layer section sandwiches the coil electrode section and is arranged such that the first protrusion electrode and the second protrusion electrode are exposed to an exterior thereof.

With this configuration, because no insulating layer is provided or necessary, the profile of the inductor can be reduced. A magnetic field caused by the first spiral electrode and a magnetic field caused by the second spiral electrode are directed toward substantially the same direction and are substantially in parallel with each other, and they are not combined and not strengthened. Thus, the inductor does not reach magnetic saturation and has good direct-current superimposition characteristics. In addition, these characteristics enable the magnetic layer section to be thinned, so the profile can be further reduced.

The magnetic layer section of the inductor according to a preferred embodiment of the present invention may preferably be made of a mixture of magnetic powder and insulating resin, for example. With this configuration, the resistivity of the magnetic layer section can be easily increased, and the above-described configuration having no insulating layer can be easily achieved.

The magnetic layer section of the inductor according to a preferred embodiment of the present invention may preferably include a first magnetic layer and a second magnetic layer, the first magnetic layer and the second magnetic layer sandwiching the first spiral electrode, the second spiral electrode, and the connection electrode, from directions substantially perpendicular to the plane. The first magnetic layer may have a through hole allowing each of the protrusion electrodes to pass therethrough. The second magnetic layer may have a depression accommodating the first spiral electrode, the second spiral electrode, and the connection electrode.

This configuration illustrates an example of a specific configuration of the inductor. With this configuration, a structure in which a portion of the coil electrode exclusive of the first protrusion electrode and the second protrusion electrode is fully surrounded by the first magnetic layer and the second magnetic layer can be achieved. Thus, characteristics of the inductor can be improved.

The second magnetic layer of the inductor according to a preferred embodiment of the present invention may include a projection at a central region of winding of each of the first spiral electrode and the second spiral electrode, the projection having a height at which it is in contact with or adjacent to the first magnetic layer. When a central three-dimensional region includes the projection, a first three-dimensional region in which a plane region of the projection virtually extends along a length in a thickness direction of the first magnetic layer, and a second three-dimensional region in which the plane region of the projection virtually extends along a length in a thickness direction of the second magnetic layer exclusive of the projection, the following relationship may be satisfied: $0.1 < Sv/Sh < 0.65$, where $Sv$ is an area of a side surface that is substantially in parallel with the thickness direction and crossing the first magnetic layer or the second magnetic layer exclusive of the projection in the central three-dimensional region, the side surface corresponding to the first spiral electrode or the second spiral electrode, and $Sh$ is an area of a cross section along a central cross section in the thickness direction of the first spiral electrode or the second spiral electrode in the central three-dimensional region.

This configuration illustrates an example of a more specific shape of the inductor. With such dimension settings, a structure that does not reach magnetic saturation while at the same time being low profile can be achieved more effectively.

Each of the first spiral electrode, the second spiral electrode, and the connection electrode of the inductor according to a preferred embodiment of the present invention may preferably be provided by a punching process performed on a single metal plate, for example. With this configuration, an integrated structure of the first spiral electrode, the second spiral electrode, and the connection electrode can be easily shaped.

The coil electrode section of the inductor according to a preferred embodiment of the present invention may further include one or more other protrusion electrodes that extend in substantially the same direction as the first protrusion electrode and the second protrusion electrode. With this configuration, the other protrusion electrodes can also be used as an intermediate tap of the inductor or an auxiliary leg in mounting the inductor.

According to a preferred embodiment of the present invention, when the coil electrode section is provided by a punching process performed on a metal plate, all of the first protrusion electrode, the second protrusion electrode, and the other protrusion electrodes of the inductor may be provided by a further bending process. With this configuration, the other protrusion electrodes can be easily shaped.

The magnetic layer section of the inductor according to a preferred embodiment of the present invention may be provided with a reinforcement disposed on an outer surface thereof, the reinforcement reinforcing at least the first protrusion electrode and the second protrusion electrode. With this configuration, the use of the reinforcement can enhance the strength of the first protrusion electrode and the second protrusion electrode.

All of the first protrusion electrode, the second protrusion electrode, and the other protrusion electrodes of the inductor according to a preferred embodiment of the present invention may be subjected to a deforming process for making a non-planar shape between the punching process and the further bending process. With this configuration, making each of the protrusion electrodes non-planar through a deforming process can enhance the strength even if these protrusion electrodes are thin.

The magnetic layer section of the inductor according to a preferred embodiment of the present invention may preferably further include a magnetic protrusion protruding in substantially the same direction as the first protrusion electrode and the second protrusion electrode. With this configuration, a component capable of serving as a leg in mounting the inductor can be made of a magnetic material, so the use of the magnetic material can shape a strong leg with a higher degree of flexibility.

The magnetic layer section of the inductor according to a preferred embodiment of the present invention may preferably have a substantially flat surface disposed opposite to a surface through which the first protrusion electrode and the second protrusion electrode are exposed. With this configuration, because the surface opposite to the mounting surface is substantially flat, the inductor can be easily attracted to a pickup nozzle of a mounter in mounting the inductor on a mounting circuit board.

According to a preferred embodiment of the present invention, a DC-DC converter includes an inductor and a mounting circuit board. The inductor includes a coil electrode section and a magnetic layer section. The coil electrode section includes a first spiral electrode, a second spiral electrode lying in substantially the same plane as the first spiral electrode and wound in substantially the same direction as the first spiral electrode, a connection electrode arranged to connect an outer end of the second spiral electrode and an outer end of the first spiral electrode, a first protrusion electrode disposed at an inner end of the first spiral electrode and extending in a direction substantially perpendicular to the plane, and a second protrusion electrode disposed at an inner end of the second spiral electrode and extending in a direction substantially perpendicular to the plane. The first protrusion electrode and the second protrusion electrode define opposite end electrodes of the coil electrode section, and the magnetic layer section sandwiches the coil electrode section and is disposed such that the first protrusion electrode and the second protrusion electrode are exposed to an exterior thereof. The planar inductor has an expanse along the plane and is thin in a thickness direction substantially perpendicular to the plane. The mounting circuit board is provided with a plurality of electronic components, the plurality of electronic components including a circuit pattern for defining a DC-DC converter and including at least a capacitor and a switching element in a specific land of the circuit pattern. The planar inductor is arranged in the vicinity of a mounting surface of the mounting circuit board so as to cover at least a portion of the plurality of electronic components, and the first protrusion electrode and the second protrusion electrode are connected to a land of the circuit pattern to be connected to an output inductor.

With this configuration, a two-layer structure in which the planar low-profile inductor is arranged on the mounting circuit board can achieve a space-saving and low-profile DC-DC converter.

The magnetic layer section of the inductor according to a preferred embodiment of the present invention may be preferably made of a mixture of magnetic powder and insulating resin.

With this configuration, the resistivity of the magnetic layer section can be easily increased, and the low-profile inductor having no insulating layer can be easily achieved. With this, the low-profile DC-DC converter can also be easily achieved.

The magnetic layer section of the planar inductor of the DC-DC converter according to a preferred embodiment of the present invention may include a first magnetic layer and a second magnetic layer, the first magnetic layer and the second magnetic layer sandwiching the first spiral electrode, the second spiral electrode, and the connection electrode from directions substantially perpendicular to the plane. The first magnetic layer may have a through hole allowing each of the protrusion electrodes to pass therethrough. The second magnetic layer may have a depression accommodating the first spiral electrode, the second spiral electrode, and the connection electrode.

This configuration illustrates an example of a specific configuration of the inductor in the DC-DC converter. With this configuration, a structure in which a portion of the coil electrode exclusive of the first protrusion electrode and the second protrusion electrode is fully surrounded by the first magnetic layer and the second magnetic layer can be achieved. Therefore, characteristics of the inductor can be improved, and thus characteristics of the DC-DC converter can also be improved.

The second magnetic layer of the planar inductor of the DC-DC converter according to a preferred embodiment of the present invention may have a projection at a central region of winding of each of the first spiral electrode and the second spiral electrode, the projection having a height at which it is in contact with or adjacent to the first magnetic layer. When a central three-dimensional region includes the projection, a first three-dimensional region in which a plane region of the projection virtually extends along a length in a thickness direction of the first magnetic layer, and a second three-dimensional region in which the plane region of the projection virtually extends along a length in a thickness direction of the second magnetic layer exclusive of the projection, the following relationship may be satisfied: $0.1<Sv/Sh<0.65$, where Sv is an area of a side surface being in substantially parallel with the thickness direction and crossing the first magnetic layer or the second magnetic layer exclusive of the projection in the central three-dimensional region, the side surface corresponding to the first spiral electrode or the second spiral electrode, and Sh is an area of a cross section along a central cross section in the thickness direction of the first spiral electrode or the second spiral electrode in the central three-dimensional region.

This configuration illustrates an example of a specific shape of the planar inductor of the DC-DC converter. With such dimension settings, a structure that does not reach magnetic saturation while at the same time being low profile can be achieved more effectively.

The coil electrode section of the planar inductor of the DC-DC converter according to a preferred embodiment of the present invention may further include one or more other protrusion electrodes that extend in substantially the same direction as the first protrusion electrode and the second protrusion electrode. At least one of the other protrusion electrodes may be connected at a position serving as an intermediate tap for the output inductor in the circuit pattern of the mounting circuit board.

With this configuration, the inductor having an intermediate tap can be easily provided. For example, when parallel-connected DC-DC converters are used, a space-saving low-profile configuration in which the inductors divided by the intermediate tap are assigned to the respective DC-DC converters can be achieved.

The coil electrode section of the planar inductor of the DC-DC converter according to a preferred embodiment of the present invention may further include one or more other protrusion electrodes that extend in substantially the same direction as the first protrusion electrode and the second protrusion electrode. Each of the other protrusion electrodes may have a length substantially the same as a distance between the planar inductor and the mounting circuit board and may be connected to a floating electrode of the mounting circuit board.

With this configuration, electrodes other than the first protrusion electrode and the second protrusion electrode electrically coupling the inductor and other circuits can be used as a leg to hold the inductor and the mounting circuit board at a specific interval. Thus, the DC-DC converter can be stronger than that having a structure that has no electrodes other than the first protrusion electrode and the second protrusion electrode.

The magnetic layer section of the planar inductor of the DC-DC converter according to a preferred embodiment of the present invention may further include a magnetic protrusion protruding in substantially the same direction as the first protrusion electrode and the second protrusion electrode, and the magnetic protrusion having a length substantially the same as the distance between the planar inductor and the mounting circuit board.

With this configuration, the magnetic protrusion can be used as a leg to hold the inductor and the mounting circuit board at a specific interval. Thus, the strength of the DC-DC converter can be increased. In addition, because a magnetic material is used in the protrusion, the degree of flexibility in the shape and the position can be higher than that when the above-described protrusion electrodes are used, so necessary strength is more easily obtainable.

In the DC-DC converter according to a preferred embodiment of the present invention, a gap between the planar inductor and the mounting circuit board may be filled with resin.

With this configuration, the resin with which the gap is filled can be used as a leg to hold the inductor and the mounting circuit board at a specific interval. Thus, the strength of the DC-DC converter can be increased. Moreover, the resin protects the electronic components on the mounting circuit board and the electrode pattern, so reliability can be improved.

According to a preferred embodiment of the present invention, the mounting circuit board and the planar inductor may be arranged in this order with reference to a mother substrate on which the DC-DC converter is to be mounted, and the mounting circuit board may include a connection unit for connection to the mother substrate.

This configuration illustrates an example of a specific shape of the DC-DC converter including a two-layer structure. Here, the mounting circuit board and the planar inductor may be arranged in this order with reference to the mother substrate.

According to a preferred embodiment of the present invention, the planar inductor and the mounting circuit board may be arranged in this order with reference to a mother substrate on which the DC-DC converter is to be mounted, and the planar inductor may include a connection unit arranged to connect the mounting circuit board to the mother substrate, the connection unit being disposed on a side surface of the planar inductor.

This configuration illustrates an example of a specific shape of the DC-DC converter including a two-layer structure. Here, the planar inductor and the mounting circuit board may be arranged in this order with reference to the mother substrate. In this case, the mounting circuit board and the mother substrate are spaced away from each other by the inductor. However, the provision of the connection unit connecting the mounting circuit board and the mother substrate on the side surface of the inductor enables the inductor and the mounting circuit board to function as a DC-DC converter.

According to a preferred embodiment of the present invention, the planar inductor and the mounting circuit board may be arranged in this order with reference to a mother substrate on which the DC-DC converter is to be mounted, and an area of the mounting circuit board projected on the mother substrate may be larger than an area of the planar inductor. The DC-DC converter may further include, in a region where the planar inductor is not present between the mounting circuit board and the mother substrate, a connection unit arranged to connect the mounting circuit board to the mother substrate.

This configuration also illustrates an example of a specific shape of the DC-DC converter including a two-layer structure. Also here, the planar inductor and the mounting circuit board may be arranged in this order with reference to the mother substrate. However, in this case, because the mounting circuit board is wider than the inductor, the structure arranged to connect the mounting circuit board and the mother substrate is disposed in the region where no inductor is arranged. Also with this structure, the mounting circuit board and the mother substrate can be connected to each other, so the inductor and the mounting circuit board can function as a DC-DC converter.

With the various preferred embodiments of the present invention, a low-profile inductor that does not reach magnetic saturation and that has good direct-current superimposition characteristics can be achieved using a simple structure. With the various preferred embodiments of the present invention, a small low-profile DC-DC converter that does not degrade its characteristics even under conditions where load changes are considerable and load current is large.

The above and other features, elements, characteristics and advantages of the present invention will become more appar-

BRIEF DESCRIPTION OF THE DRAWINGS

FIG. 2A is a plan view of a coil electrode section of the inductor according to the first preferred embodiment of the present invention, FIG. 2B is a side view of the coil electrode section, FIG. 2C is a plan view of a first magnetic layer, FIG. 2D is a side view of the first magnetic layer, FIG. 2E is a plan view of a second magnetic layer, and FIG. 2F is a side view of the second magnetic layer.

DETAILED DESCRIPTION OF THE PREFERRED EMBODIMENTS

An inductor according to a first preferred embodiment of the present invention is described with reference to the drawings.

Figure 1A:
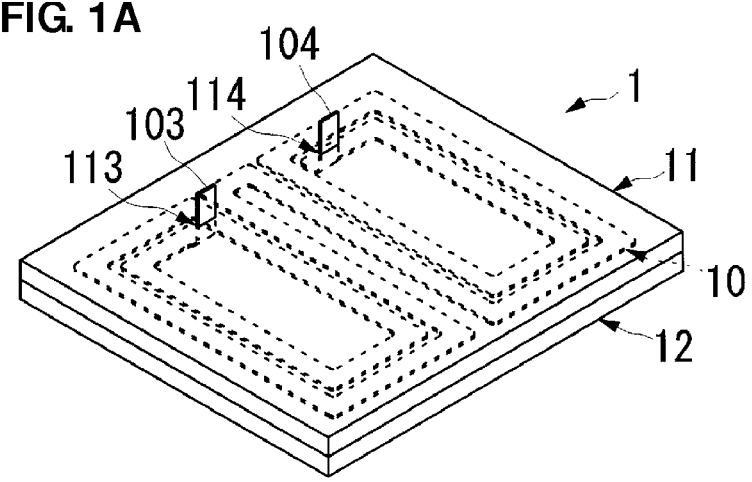
FIG. 1A is an external perspective view of an inductor according to a first preferred embodiment of the present invention and FIG. 1B is an exploded perspective view of the inductor shown in FIG. 1A.
Figure 1B:
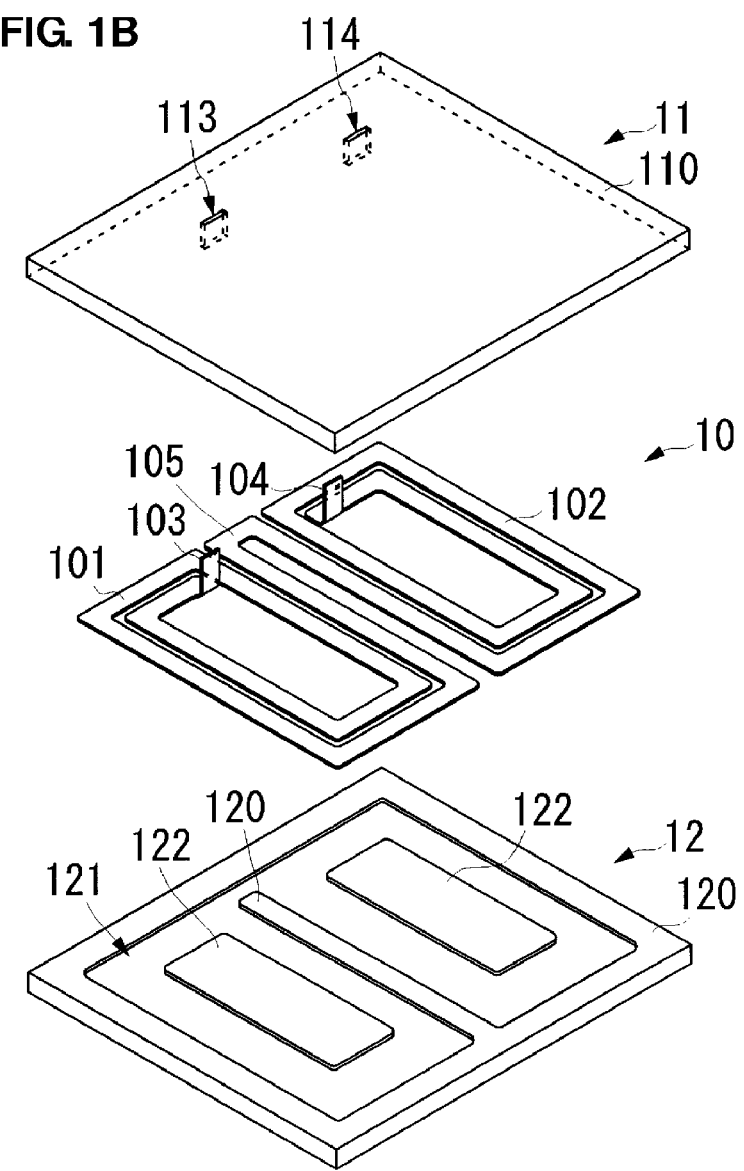

FIG. 1A is an external perspective view of an inductor 1 according to the present preferred embodiment, and FIG. 1B is an exploded perspective view of the inductor 1.

FIG. 2A is a plan view of a coil electrode section 10, and FIG. 2B is a side view of the coil electrode section 10. FIG. 2C is a plan view of a first magnetic layer 11, and FIG. 2D is a side view of the first magnetic layer 11. FIG. 2E is a plan view of a second magnetic layer 12, and FIG. 2F is a side view of the second magnetic layer 12.

Figure 3:
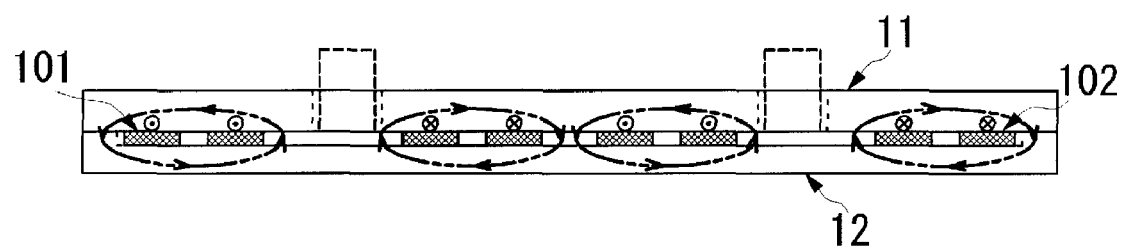
FIG. 3 is a side cross-sectional view that schematically illustrates behavior of magnetic fields produced from the inductor according to the first preferred embodiment of the present invention.

FIG. 3 is a side cross-sectional view that schematically illustrates behavior of magnetic fields produced from the inductor 1 according to the present preferred embodiment of the present invention. In FIG. 3, the thick chain double-dashed lines schematically indicate a portion of magnetic fields occurring in the inductor 1.

As illustrated in FIGS. 1A and 1B, the inductor 1 includes the planar coil electrode section 10, the first magnetic layer 11, and the second magnetic layer 12. The first magnetic layer 11 and the second magnetic layer 12 define a magnetic component that surrounds the coil electrode section 10. The coil electrode section 10 includes a first protrusion electrode 103 and a second protrusion electrode 104. The first protrusion electrode 103 and the second protrusion electrode 104 protrude from the first magnetic layer 11 by a specific length, whereas almost all of the coil electrode section 10 is sandwiched between the first magnetic layer 11 and the second magnetic layer 12 from both directions substantially perpendicular to the plane surface of the coil electrode section 10. The first protrusion electrode 103 and the second protrusion electrode 104 define opposite end electrodes of the inductor 1.

The coil electrode section 10 includes a first spiral electrode 101 and a second spiral electrode 102. The first spiral electrode 101 and the second spiral electrode 102 lie in substantially the same plane and in different regions and are wound in substantially the same direction. For example, for the present preferred embodiment, the first spiral electrode 101 starts at the inner end and terminates at the outer end and is wound counterclockwise when viewed from the first magnetic layer 11, whereas the second spiral electrode 102, which is related to the first spiral electrode 101, starts at the outer end and terminates at the inner end and is wound counterclockwise when viewed from the first magnetic layer 11.

The outer end of the first spiral electrode 101 and that of the second spiral electrode 102 are adjacent to each other such that a specific gap is present therebetween, and the outer ends are connected by a connection electrode 105. The first protrusion electrode 103 is disposed at the inner end of the first spiral electrode 101 and extends along a direction substantially perpendicular to the plane on which the first spiral electrode 101 is disposed. The second protrusion electrode 104 is disposed at the inner end of the second spiral electrode 102 and extends in substantially parallel with the first protrusion electrode 103. The length of each of the first protrusion electrode 103 and the second protrusion electrode 104 is set at a value that is longer than the thickness of the first magnetic layer 11 and that allows each of the first protrusion electrode 103 and the second protrusion electrode 104 to be connected to a mounting circuit board when the inductor is mounted on a mounting circuit board described below.

The first spiral electrode 101, the second spiral electrode 102, the first protrusion electrode 103, the second protrusion electrode 104, and the connection electrode 105 included in the coil electrode section 10 are integrally formed. Specifically, a method of performing a punching process on a metal plate, such as a copper plate, that has a specific thickness (e.g., approximately 0.2 mm) and that includes all the above-described portions being integrally formed and then performing a bending process on portions corresponding to the first protrusion electrode 103 and the second protrusion electrode 104 can be used. The use of such punching and bending processes performed on a metal plate enables the coil electrode section 10 to be easily formed using a simple step.

The first magnetic layer 11 has a planar shape with a specific thickness (e.g., approximately 0.4 mm to approximately 0.6 mm). The first magnetic layer 11 has through holes 113 and 114 arranged to allow the first protrusion electrode 103 and the second protrusion electrode 104 to pass therethrough, respectively.

The second magnetic layer 12 also has a planar shape with a specific thickness (e.g., approximately 0.4 mm to approximately 0.6 mm; preferably, the thickness of a region corresponding to the bottom of a depression 121 is equal to the thickness of the first magnetic layer). The depression 121 of the second magnetic layer 12 accommodates the first spiral electrode 101, the second spiral electrode 102, and the connection electrode 105 of the coil electrode section 10. The depression 121 has a depth that is substantially the same as the thickness of each of the first spiral electrode 101, the second spiral electrode 102, and the connection electrode 105 and that allows them to be fully accommodated therein.

The second magnetic layer 12 includes a projection 122 disposed in a central region of the winding of each of the first spiral electrode 101 and the second spiral electrode 102. The projection 122 has a height at which it is in contact with or adjacent to the first magnetic layer 11 when the external portions of the second magnetic layer 12 are in contact with the first magnetic layer 11. The present preferred embodiment illustrates an example in which each of the first spiral electrode 101, the second spiral electrode 102, and the projection 122 is a substantially rectangular parallelepiped, for example. However, it may have a shape in which the edges of side walls of a substantially rectangular parallelepiped are chamfered or rounded, a substantially cylindrical shape, a substantially elliptical cylindrical shape, or a columnar shape in which its planar cross section is polygonal, for example.

The first magnetic layer 11 and the second magnetic layer 12, which preferably have the above-described structures, sandwich the first spiral electrode 101, the second spiral electrode 102, and the connection electrode 105, thus enabling all of the first spiral electrode 101, the second spiral electrode 102, and the connection electrode 105, including their side surfaces, to be fully surrounded by the first magnetic layer 11 and the second magnetic layer 12. With this, an inductor that has better characteristics than that when simple planar magnetic layers switch the electrodes is configurable.

A magnetic material that exhibits high resistivity selected from among ferrite-based, dust-based, metal-based, and other materials can be used in the first magnetic layer 11 and the second magnetic layer 12. For example, a magnetic material that has a resistivity of approximately $10^3$ Ω·m or more can be used. The use of such a high-resistivity material in the first magnetic layer 11 and the second magnetic layer 12 can eliminate the necessity of having an insulating layer inserted between the first magnetic layer 11 and the coil electrode section 10 and between the second magnetic layer 12 and the coil electrode section 10, unlike a typical inductor illustrated in the related art. Accordingly, the profile can be reduced by the amount of thicknesses of two insulating layers, so a lower profile inductor than traditional inductors is configurable.

In addition, because the first spiral electrode 101 and the second spiral electrode 102 lie at different regions in substantially the same plane and are wound in substantially the same direction, as described above, a magnetic field produced by the first spiral electrode 101 and that by the second spiral electrode 102 are not combined and thus not strengthened, as illustrated in FIG. 3. Thus, even if a large current passes, the strength of produced magnetic fields can be weaker than that when magnetic fields are combined. Therefore, magnetic saturation does not occur without having to have thick magnetic layers. Accordingly, good direct-current superimposition characteristics are obtainable even with thin magnetic layers. That is, a low-profile inductor having good direct-current superimposition characteristics is configurable.

When the inductor 1 having the above-described configuration is formed and the inductor 1 is mounted such that the first protrusion electrode 103 and the second protrusion electrode 104 are positioned in the vicinity of the mounting circuit board, because the surface of the second magnetic layer 12 is substantially flat, the inductor can be easily attracted by a pick-up nozzle in mounting. Thus, an inductor that enables good mounting workability without having to use another tool is configurable.

Figure 4A:
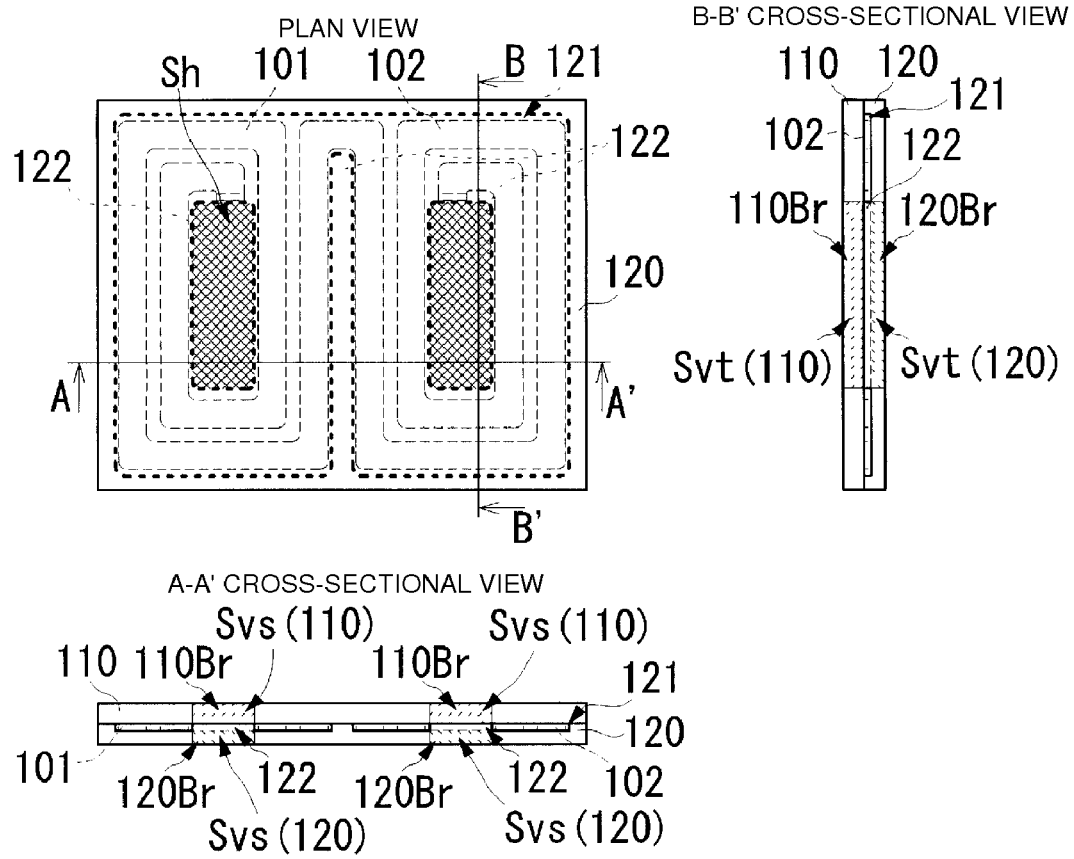
FIGS. 4A to 4C are illustrations for describing definitions of dimensions of a central three-dimensional region.
Figure 4B:
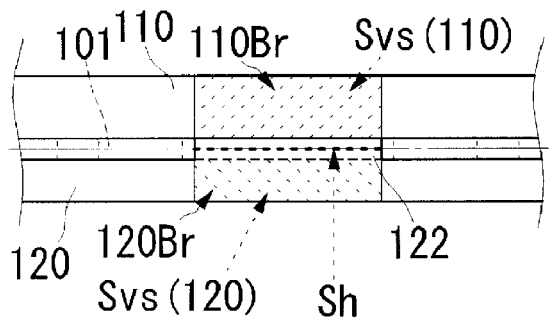
Figure 4C:
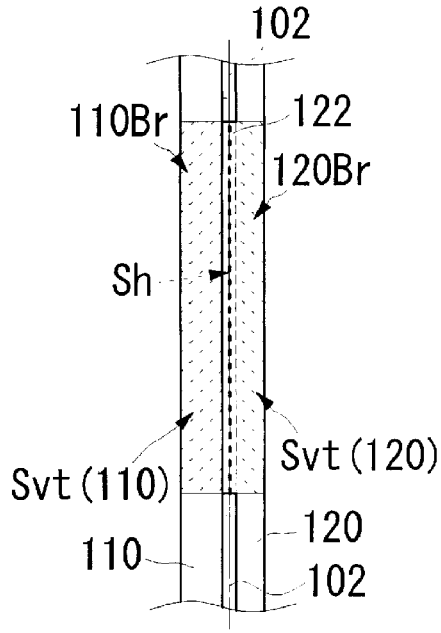
Figure 5:
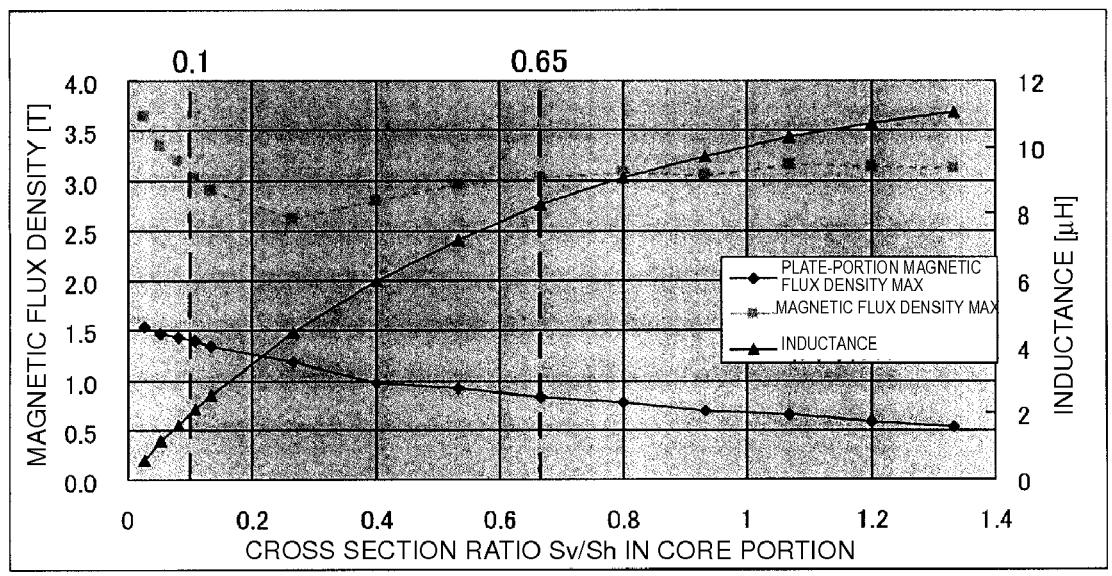
FIG. 5 illustrates changes in characteristics as an inductor in accordance with settings of dimensions of the central three-dimensional region.

For the inductor 1 having the above configuration, it is preferable that dimensions of a specific three-dimensional region, including the projection 122 surrounded by each of the first spiral electrode 101 and the second spiral electrode 102, may be set as described below. FIG. 4A are a plan view and cross-sectional views from substantially perpendicular side directions for describing the dimensions of the three-dimensional region; FIG. 4B is an enlarged view of a cross section taken along the line A-A' of FIG. 4A; and FIG. 4C is an enlarged view of a cross section taken along the line B-B' of FIG. 4A. FIG. 5 illustrates changes in characteristics as an inductor in accordance with settings of the dimensions of the three-dimensional region.

As illustrated in FIGS. 4A to 4C, the three-dimensional region, containing the projections 122, includes each of the projections 122 of the second magnetic layer 12, a first three-dimensional region 110Br in which the plane region of the projection 122 virtually extends along the length in the thickness direction of the first magnetic layer 11, and a second three-dimensional region 120Br in which the plane region of the projection 122 is virtually extended along the length in the thickness direction of the second magnetic layer 12 exclusive of the projection 122. Here, when the projection 122 is a substantially rectangular parallelepiped, the area Sv for the first magnetic layer 11 can be represented by Sv(110)=2×(Svs(110)+Svt(110)), where the lateral areas of outer surfaces substantially parallel with the thickness direction of the first three-dimensional region 110Br of the first magnetic layer 11 are Svs(110) and Svt(110); similarly, the area Sv for the second magnetic layer 12 can be represented by Sv(120)=2×(Svs(120)+Svt(120)), where the lateral areas of outer surfaces substantially parallel with the thickness direction of the second three-dimensional region 120Br of the second magnetic layer are Svs(120) and Svt(120). The area Sh (hatched by the solid oblique lines in FIG. 4A) of a cross section of the projection 122 along a central cross section in the thickness direction of the first spiral electrode 101 or the second spiral electrode 102, the area Sv(110), and the area Sv(120) are set in a specific ratio.

Specifically, the ratio can be set as 0.1<Sv(110)/Sh<0.65 and 0.1<Sv(120)/Sh<0.65. This is because, if Sv/Sh is smaller than 0.1, as illustrated in FIG. 5, the magnetic flux density increases and partial magnetic saturation is likely to occur, and if Sv/Sh is larger than 0.65, as illustrated in FIG. 5, even when the lateral area Sv is increased, that is, the inductor 1 has an increased thickness, the effect of reducing the magnetic flux density is saturated. The present preferred embodiment illustrates an example in which the projection 122 is in contact with the first magnetic layer 11. However, also when they are not in contact with each other, similar settings can be made.

The present preferred embodiment illustrates an example in which the planar first protrusion electrode 103 and second protrusion electrode 104 simply serve as opposite end electrodes of the inductor 1. Alternatively, in mounting the inductor 1 on a mounting circuit board, as described above, reinforcing the first protrusion electrode 103 and the second protrusion electrode 104 using the structures illustrated in FIGS. 6A to 6C achieves the stronger connection section during and after the mounting.

Figure 6A:
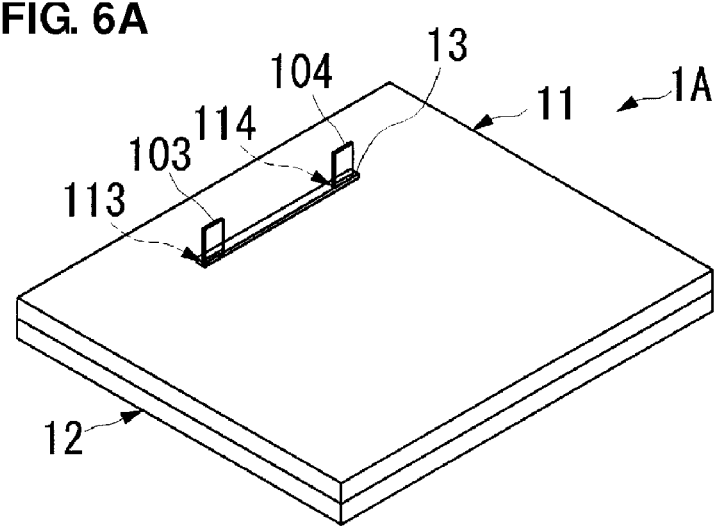
FIGS. 6A to 6C are external perspective views that illustrate example inductors having other configurations according to the first preferred embodiment of the present invention.
Figure 6B:
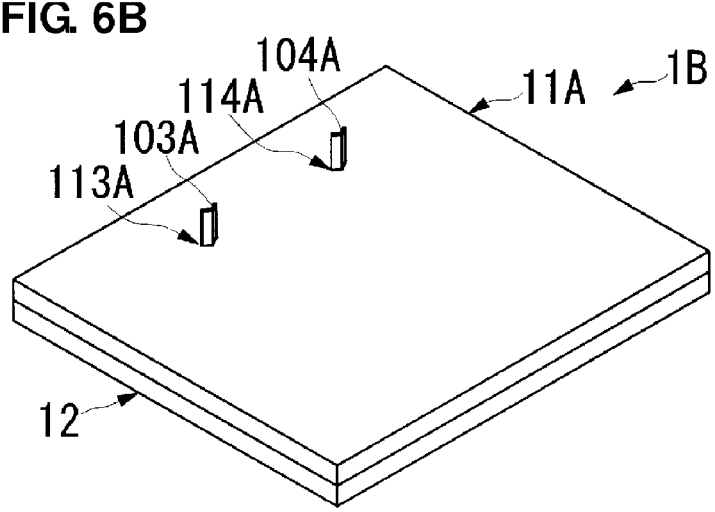
Figure 6C:
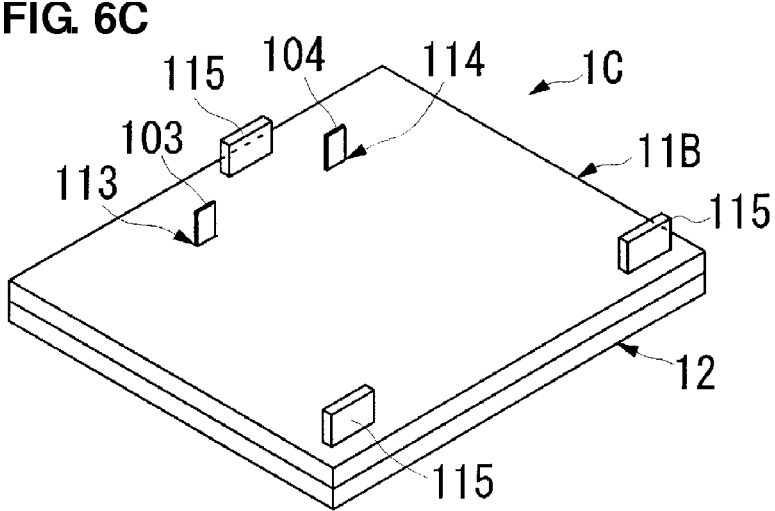

FIGS. 6A to 6C illustrate example inductors having other configurations according to the present preferred embodiment. FIG. 6A illustrates an example using a reinforcement 13; FIG. 6B illustrates an example in which the shape of each of the first protrusion electrode and the second protrusion electrode is changed to a three-dimensional (non-planar) shape; and FIG. 6C illustrates an example that uses magnetic protrusions 115.

An inductor 1A illustrated in FIG. 6A has a structure in which the first protrusion electrode 103 and the second protrusion electrode 104 are reinforced by the reinforcement 13 at the position where they project from the first magnetic layer 11. The other configuration is substantially the same as in the inductor 1 illustrated in FIGS. 1A and 1B. An insulation material, such as insulating resin, can be used in the reinforcement 13. With this structure, the strength of the reinforcement 13 is added to the strength of the first protrusion electrode 103 and the second protrusion electrode 104, so the mechanical strength can be enhanced.

An inductor 1B illustrated in FIG. 6B includes a first protrusion electrode 103A and a second protrusion electrode 104A. Both of the electrodes do not have a simple planar shape but have a non-planar shape that is bent at an intermediate point in the width direction. The first protrusion electrode 103A and the second protrusion electrode 104A are bent at the positions where they are connected to the first spiral electrode 101 and the second spiral electrode 102, respectively. Each of these bent shapes can be easily made by formation of an indentation corresponding to the bent shape on the planar surface by, for example, pressing before the first protrusion electrode 103A and the second protrusion electrode 104A are formed by a bending process. When the first protrusion electrode 103A and the second protrusion electrode 104A have the above-described shapes, the first magnetic layer 11 includes through holes 113A and 114A, each having a substantially rectangular cross section that is bent at an intermediate point in the longitudinal direction of the hole in plan view. The use of the first protrusion electrode 103A and the second protrusion electrode 104A having such a bent shape in the width direction of the plane can make the mechanical strength larger than that when the planar first protrusion electrode 103 and the second protrusion electrode 104 are simply used. The three-dimensional bent shape illustrated in FIG. 6B is merely an example, so it may have other shapes as long as it has a non-planar structure, such as the one in which the plane is bent in the width direction.

An inductor 1C illustrated in FIG. 6C includes the plurality of magnetic protrusions 115 each having a length substantially the same as that of the protruding portion of each of the first protrusion electrode 103 and the second protrusion electrode 104. The magnetic protrusions 115 are disposed on a surface of the first magnetic layer 11 from which the first protrusion electrode 103 and the second protrusion electrode 104 protrude. The magnetic protrusions 115 are arranged so as to alternatively receive or share forces exerted on the first protrusion electrode 103 and the second protrusion electrode 104 when the inductor 1C is mounted on a mounting circuit board. For example, in the case of the example illustrated in FIG. 6C, the magnetic protrusions 115 are arranged at a central adjacent position at a side adjacent to the first protrusion electrode 103 and the second protrusion electrode 104 of the first magnetic layer 11 and at opposite end adjacent positions at a side remote from the first protrusion electrode 103 and the second protrusion electrode 104. Each of the magnetic protrusions 115 has the same material configuration as the first magnetic layer 11 and is integrally formed with the first magnetic layer 11. Although a similar structure can be achieved even if they are separately formed, the use of such integrally forming achieves a simpler step. With this configuration, forces exerted on the first protrusion electrode 103 and the second protrusion electrode 104 are distributed to the magnetic protrusions 115, and thus the mechanical strength can be enhanced. The shape and the position of each of the magnetic protrusions 115 and the number of the magnetic protrusions 115 illustrated in FIG. 6C are merely examples, so they can be set depending on the mounting specifications on a mounting circuit board.

Next, an inductor according to a second preferred embodiment is described with reference to the drawings.

Figure 7A:
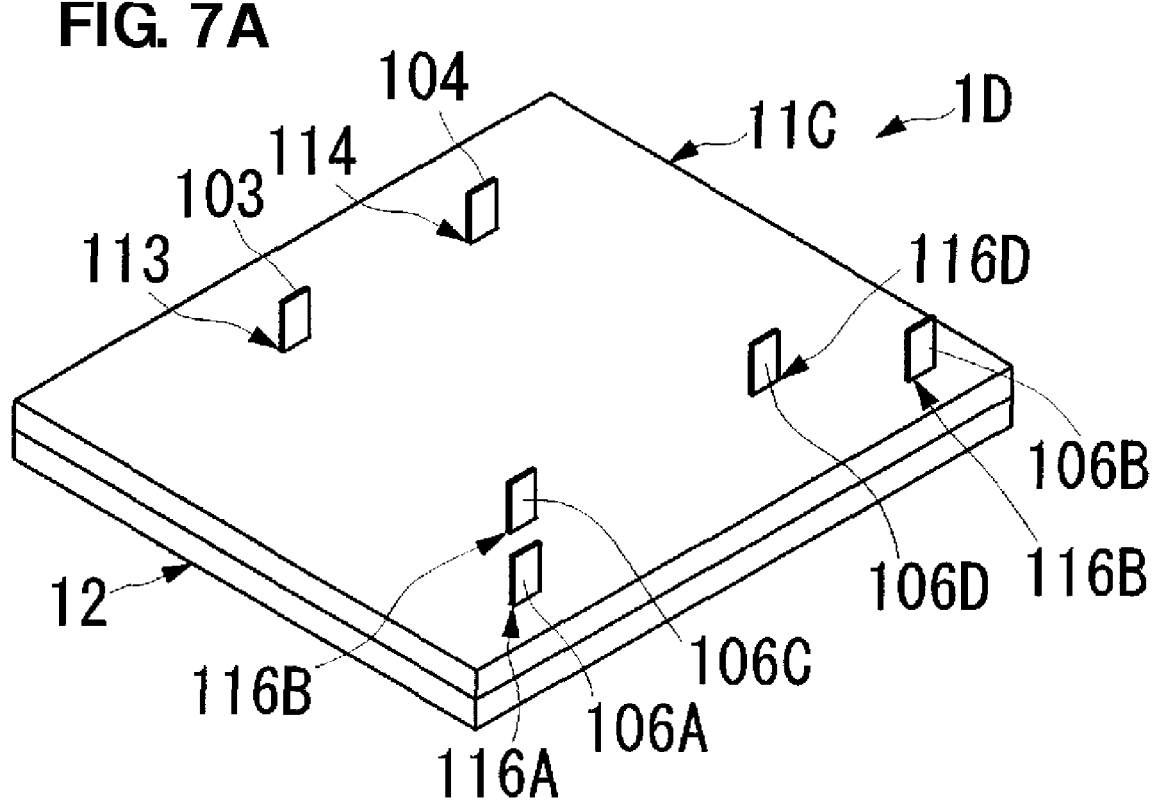
FIG. 7A is an external perspective view of an inductor according to a second preferred embodiment of the present invention.
Figure 7B:
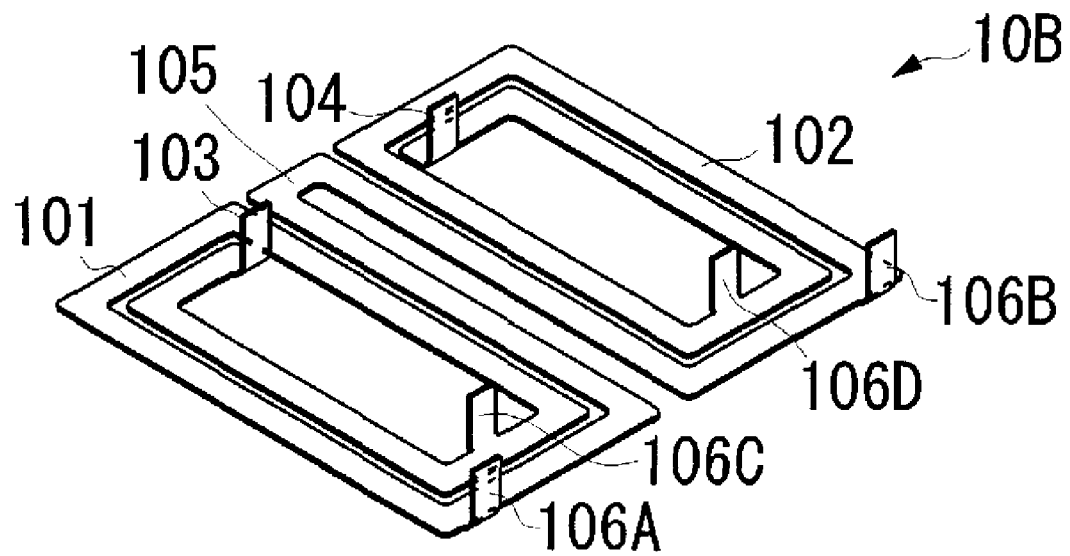
FIG. 7B is an external perspective view of a coil electrode shown in FIG. 7A.

FIG. 7A is an external perspective view of an inductor 1D according to the present preferred embodiment. FIG. 7B is an external perspective view of a coil electrode section 10B used in the inductor 1D according to the present preferred embodiment.

The inductor 1D according to the present preferred embodiment is the one in which the coil electrode section 10B of the inductor 1 illustrated in FIGS. 1A and 1B according to the first preferred embodiment further includes protrusion electrodes 106A to 106D. The protrusion electrodes 106A to 106D are disposed at positions different from the positions of the first protrusion electrode 103 and the second protrusion electrode 104 in the first spiral electrode 101, the second spiral electrode 102, and the connection electrode 105. Each of the protrusion electrodes 106A to 106D has a width and a length substantially the same as those of each of the first protrusion electrode 103 and the second protrusion electrode 104. In relation to this coil electrode section 10B, a first magnetic layer 11C includes through holes 116A to 116D at positions corresponding to the protrusion electrodes 106A to 106D.

With this structure, in mounting the inductor 1D, when the protrusion electrodes 106A to 106D are joined to floating electrodes of a mounting circuit board, they can be used as reinforcements in substantially parallel with the first protrusion electrode 103 and the second protrusion electrode 104. This can increase the mechanical strength when the inductor 1D is mounted. If at least specific one of the protrusion electrodes 106A to 106D is connected at a specific circuit position of a mounting circuit board, it can be used as an intermediate tap electrode for the inductor 1D. If it is used as an intermediate tap electrode, when parallel-connected DC-DC converters are used, for example, the inductors divided by the intermediate tap electrodes can be assigned as an output inductor of the respective DC-DC converters and the outputs of the parallel-connected DC-DC converters can be substantially the same all the time. In such a way, with the configuration according to the present preferred embodiment, an inductor utilized for various purposes can be formed.

The formation of the protrusion electrodes 106A to 106D at the outermost portions or the innermost portions of the first spiral electrode 101 and the second spiral electrode 102 allows them to be formed by a simple bending process, as in the case of the first protrusion electrode 103 and the second protrusion electrode 104.

The positions and the number of the protrusion electrodes 106A to 106D illustrated in FIGS. 7A and 7B are merely examples, so they can be set depending on the specifications.

Next, DC-DC converters according to a third preferred embodiment are described with reference to the drawings.

Figure 8A:
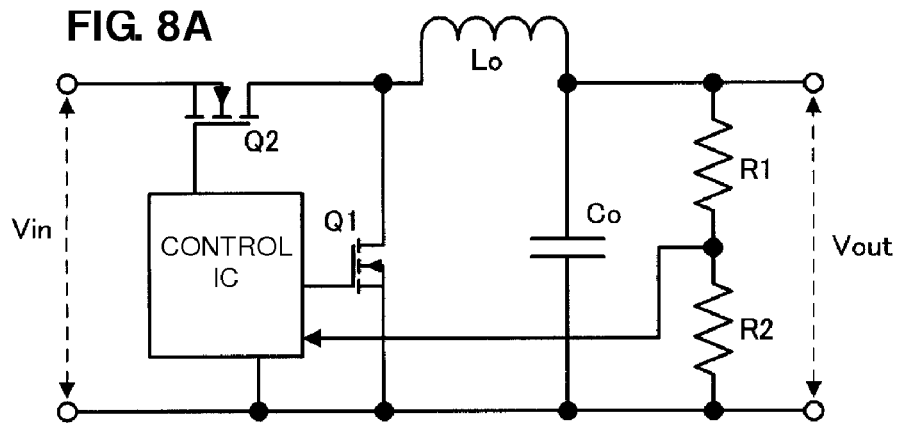
FIGS. 8A to 8C are equivalent circuit diagrams of DC-DC converters according to a third preferred embodiment of the present invention.
Figure 8B:
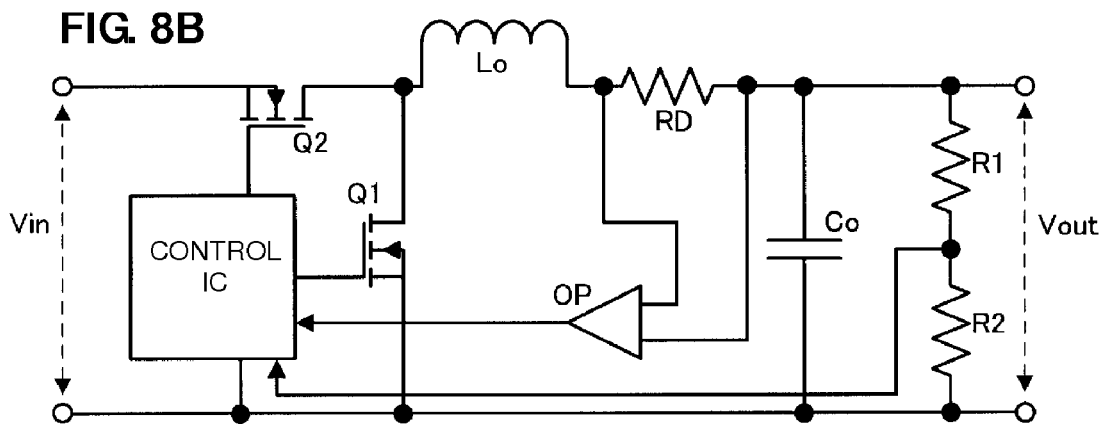
Figure 8C:
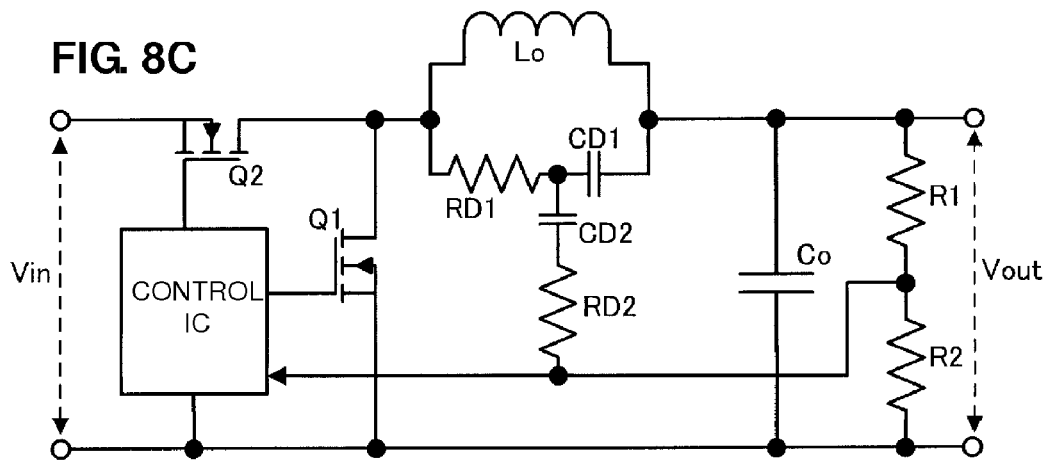

FIGS. 8A to 8C are equivalent circuit diagrams of the DC-DC converters according to the present preferred embodiment. Here, three types of DC-DC converter are illustrated in FIGS. 8A to 8C, but other configurations can also be used.

A DC-DC converter illustrated in FIG. 8A is a non-isolated step-down converter that controls switching depending on the output current value. The DC-DC converter includes switching elements Q1 and Q2, an output inductor Lo, a smoothing capacitor Co, resistor elements R1 and R2 for use in output current detection, and a control IC.

A DC-DC converter illustrated in FIG. 8B is a non-isolated step-down converter that controls switching using not only an output current value but also results of current detection by the output inductor Lo. The DC-DC converter further includes a resistor RD and an operational amplifier OP for use in detecting a current value of the output inductor Lo, in addition to the configuration illustrated in FIG. 8A.

A DC-DC converter illustrated in FIG. 8C is a non-isolated step-down converter that controls switching using not only an output current but also results of current detection by the output inductor Lo. The DC-DC converter further includes a series circuit including a resistor RD1 and a capacitor CD1 and a series circuit including a capacitor CD2 and a resistor RD2 to obtain a current value of the output inductor Lo, in addition to the configuration illustrated in FIG. 8A.

In each of the above-described DC-DC converters, the output inductor Lo is achieved by the inductor illustrated in the first preferred embodiment or the second preferred embodiment. Other circuit elements and circuit patterns are achieved by electrode patterns disposed on a mounting circuit board and a mounted electronic component SMD, which is described below. With this configuration, in particular, in the case of a DC-DC converter utilized in point of load (POL), because load current drastically increases or decreases and a reduction in size and profile is required, the configuration illustrated below according to the present preferred embodiment is further effective.

Next, concrete structural configurations of the DC-DC converters are described. FIGS. 9A to 9C, 10A, and 10B are side views that schematically illustrate structural configurations of the DC-DC converters according to the present preferred embodiment.

Each of DC-DC converters M1 to M5 illustrated in those drawings has a two-layer structure as a basic structure. A mounting circuit board with the above circuit elements mounted thereon is mounted on a mother substrate (not illustrated), and an inductor serving as the output inductor Lo is disposed on that mounting circuit board.

Figure 9A:
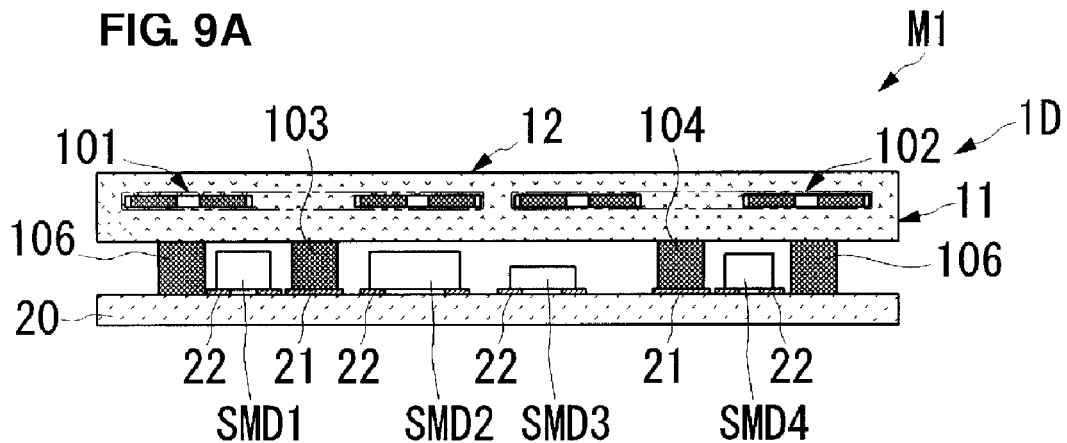
FIGS. 9A to 9C are side views that schematically illustrate structural configurations of the DC-DC converters according to the third preferred embodiment of the present invention.

The DC-DC converter M1 illustrated in FIG. 9A includes the inductor 1D including the protrusion electrodes 106 (106A to 106D) illustrated in the above preferred embodiment and a mounting circuit board 20. The mounting circuit board 20 includes a circuit pattern defining circuitry illustrated in one of the circuits illustrated in FIGS. 8A to 8C and includes connection land electrodes 21 and mounting land electrodes 22 disposed on the mounting surface. Circuit elements SMD1 to SMD4 define circuitry illustrated in one of FIGS. 8A to 8C are mounted on the mounting land electrodes 22. The first protrusion electrode 103 and the second protrusion electrode 104 of the inductor 1D are connected to the respective connection land electrodes 21. The protrusion electrodes 106 are joined to floating electrodes (not illustrated). For this configuration, the first protrusion electrode 103, the second protrusion electrode 104, the connection electrode 105, and the protrusion electrodes 106 function as legs to support the inductor 1D at a specific position on the mounting circuit board 20.

With such a two-layer structure, the area of the plane of the DC-DC converter to the mother substrate can be smaller than that when a traditional discrete inductor is directly set and mounted on the mounting surface of the mounting circuit board 20, so space saving can be achieved. Moreover, the use of the above-described low-profile inductor enables a low-profile DC-DC converter even with a two-layer structure.

Figure 9B:
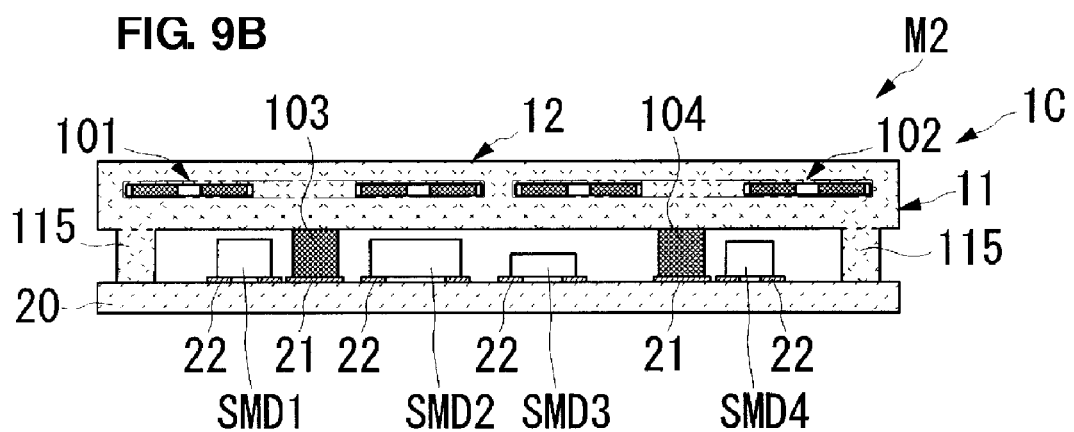

The DC-DC converter M2 illustrated in FIG. 9B includes the inductor 1C including the magnetic protrusions 115 illustrated in the above preferred embodiment and the mounting circuit board 20. The basic configuration of the mounting circuit board 20 is substantially the same as in FIG. 9A. The DC-DC converter M2 has a structure in which the magnetic protrusions 115 are in contact with the mounting surface of the mounting circuit board 20. The magnetic protrusions 115 function as legs to support the inductor 1C. Even with this configuration, a space-saving low-profile DC-DC converter can be provided. Moreover, higher mechanical strength is obtainable by an increase in the area of a cross section that substantially perpendicular to the direction in which the magnetic protrusions 115 extend.

Figure 9C:
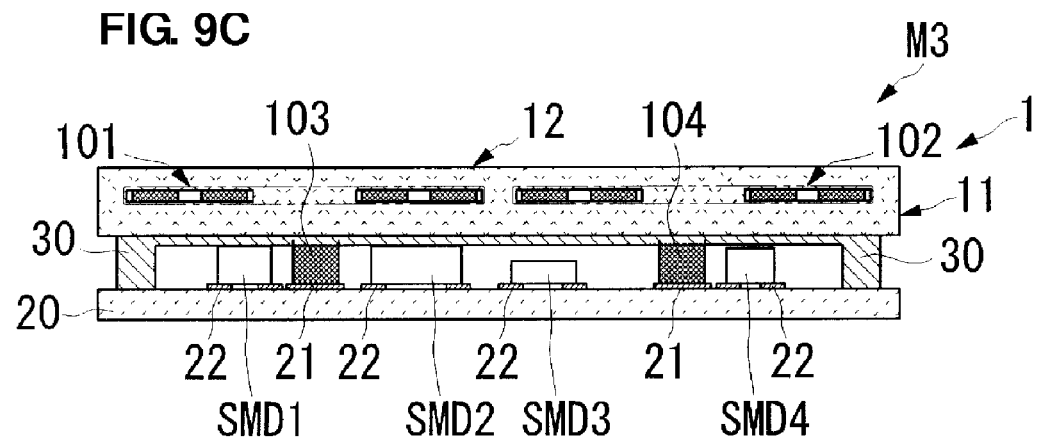

The DC-DC converter M3 illustrated in FIG. 9C includes the inductor 1 having the basic configuration illustrated in the above preferred embodiment and the mounting circuit board 20. The basic configuration of the mounting circuit board 20 is substantially the same as in FIG. 9A. For the DC-DC converter M3, reinforcement legs 30 are arranged at a low portion of the inductor 1, that is, on the surface of the first magnetic layer 11. An isolating material that has specific mechanical strength is used in the reinforcement legs 30. The reinforcement legs 30 perform functions similar to those of the above-described magnetic protrusions 115. Even with this configuration, a space-saving low-profile DC-DC converter can be provided. Moreover, higher mechanical strength is obtainable by an increase in the area of a cross section that substantially perpendicular to the direction in which the reinforcement legs 30 extend.

Figure 10A:
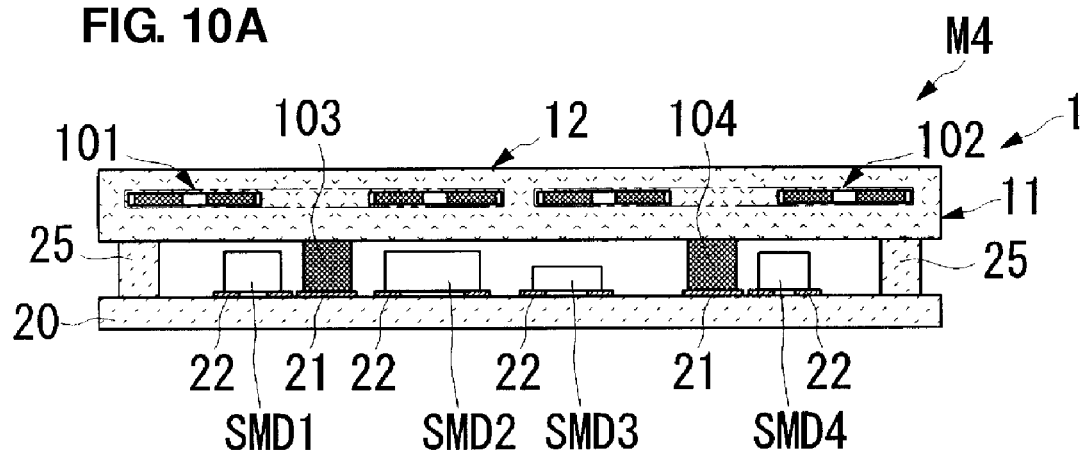
FIGS. 10A and 10B are side views that schematically illustrate structural configurations of the DC-DC converters according to the third preferred embodiment of the present invention.

The DC-DC converter M4 illustrated in FIG. 10A includes the inductor 1 having the above-described simplest structure and the mounting circuit board 20, as in the case of DC-DC converter M3 illustrated in FIG. 9C. The basic configuration of the mounting circuit board 20 is substantially the same as in FIG. 9A. Dielectric supports 25 corresponding to the length of the protruding portion of each of the first protrusion electrode 103 and the second protrusion electrode 104 are disposed on the mounting surface of the mounting circuit board 20. Even with this configuration, a space-saving low-profile DC-DC converter can be provided. Moreover, higher mechanical strength is obtainable by an increase in the area of a cross section that substantially perpendicular to the direction in which the supports 25 extend.

Figure 10B:
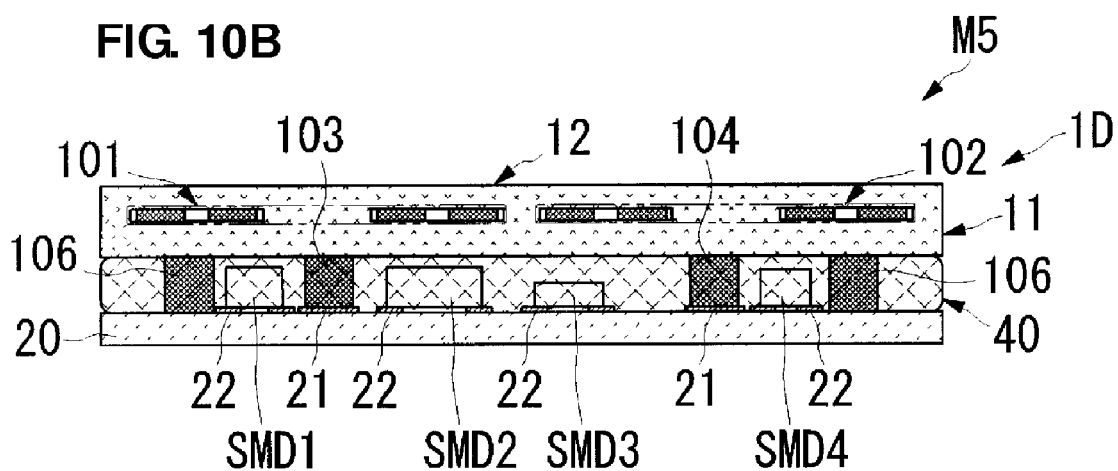

The DC-DC converter M5 illustrated in FIG. 10B has a structure in which the gap between the inductor 1D and the mounting circuit board 20 in the inductor M1 illustrated in FIG. 9A is filled with an underfill 40 made of, for example, insulating resin. Even with this configuration, a space-saving low-profile DC-DC converter can be provided, and the mechanical strength can be increased by the underfill 40. Moreover, the first protrusion electrode 103, the second protrusion electrode 104, the protrusion electrodes 106, and the circuit elements SMD1 to SMD4 can be externally protected by the underfill 40, so a more reliable DC-DC converter can be provided.

The configurations illustrated in FIGS. 9A to 9C, 10A, and 10B are merely non-limiting examples of preferred embodiments of the present invention. A DC-DC converter of any combination of these configurations can be made.

Next, DC-DC converters according to a fourth preferred embodiment are described with reference to the drawings.

Figure 11A:
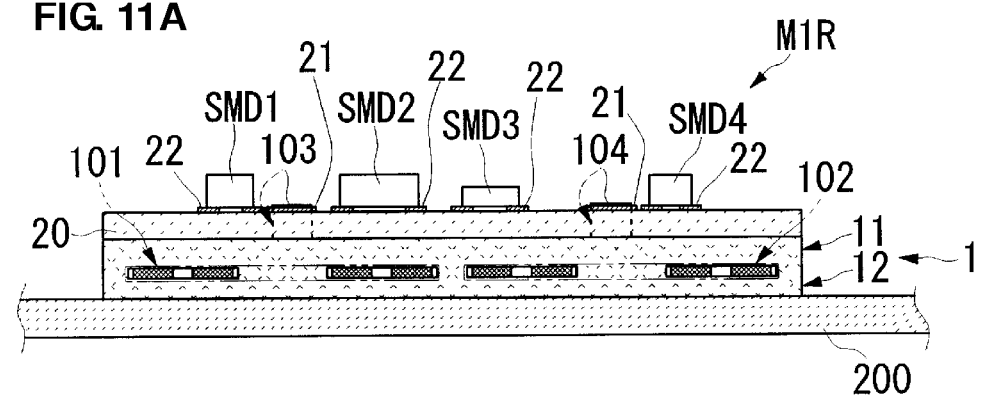
FIGS. 11A and 11B are side views that schematically illustrate structural configurations of DC-DC converters according to a fourth preferred embodiment of the present invention.
Figure 11B:
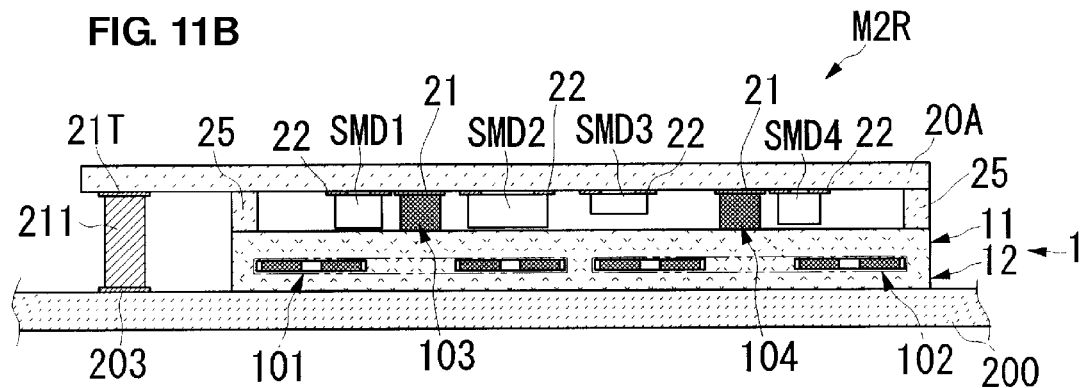

FIGS. 11A and 11B are side views that schematically illustrate structural configurations of the DC-DC converters according to the present preferred embodiment.

DC-DC converters M1R and M2R illustrated in FIGS. 11A and 11B also have a two-layer structure as a basic structure. Unlike the DC-DC converters illustrated in FIGS. 9 and 10, the DC-DC converters M1R and M2R have a structure in which the inductor 1 is disposed on a mother substrate and a mounting circuit board with circuit elements being mounted thereon is mounted on the inductor 1.

For the DC-DC converter M1R illustrated in FIG. 11A, the above-described inductor 1 is disposed on a mother substrate 200. At this time, the inductor 1 is disposed such that the substantially flat surface of the second magnetic layer 12 is in contact with the mother substrate 200. The mounting circuit board 20 is disposed on the surface of the first magnetic layer 11 of the inductor 1. At this time, the mounting circuit board is disposed such that a surface opposite to the mounting surface on which the circuit elements are mounted is in contact with the first magnetic layer 11 of the inductor 1. The mounting configuration of the circuit elements SMD1 to SMD4 of the mounting circuit board 20 is substantially the same as that in the above-described mounting circuit board 20 illustrated in FIGS. 9 and 10. The mounting circuit board 20 illustrated in FIG. 11A includes through holes (not illustrated) arranged to allow the first protrusion electrode 103 and the second protrusion electrode 104 of the inductor 1 to be exposed therethrough to the mounting surface. Through these through holes, the first protrusion electrode 103 and the second protrusion electrode 104 are connected to the connection land electrodes 21 on the mounting surface. Wiring electrodes (not illustrated) are disposed on side surfaces of the inductor 1. Through these wiring electrodes, the mounting circuit board 20 and the mother substrate 200 are electrically coupled to each other. Even with this configuration, a space-saving low-profile DC-DC converter can be provided.

For the DC-DC converter M2R illustrated in FIG. 11B, the inductor 1 is directly disposed on the mother substrate 200, like the DC-DC converter illustrated in FIG. 11A. For the DC-DC converter M2R, a mounting circuit board 20A is spaced away from the inductor 1 by a specific distance, and the mounting surface faces the inductor 1. The mounting circuit board 20A has an area lager than the inductor 1 in plan view. The electrical coupling and the supporting structure between the inductor 1 and the mounting circuit board 20A is one in which the structure illustrated in FIG. 9A described above is inverted. Joining the first protrusion electrode 103 and the second protrusion electrode 104 to the connection land electrodes 21 achieves the electrical coupling. The first protrusion electrode 103, the second protrusion electrode 104, and the dielectric supports 25 achieve the supporting mechanism to support the mounting circuit board 20A. As illustrated in FIG. 11B, when the mounting circuit board 20A is wider than the inductor 1, the electrical coupling between the mounting circuit board 20A and the mother substrate 200 in a region where the inductor 1 is not disposed therebetween is achieved by connecting a connection land electrode 21T of the mounting circuit board 20A and a connection land electrode 203 of the mother substrate 200 using a conductive support 211 disposed therebetween. Even with this configuration, a space-saving low-profile DC-DC converter can be provided.

The configurations illustrated in FIGS. 11A and 11B are merely non-limiting examples of preferred embodiments of the present invention. A DC-DC converter of any combination of these configurations can be made.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inductor comprising:
a coil electrode section; and
a magnetic layer section,
the coil electrode section including:
    a first spiral electrode;
    a second spiral electrode lying in substantially a same plane as the first spiral electrode and wound in substantially a same direction as the first spiral electrode;
    a connection electrode arranged to connect an outer end of the second spiral electrode and an outer end of the first spiral electrode;
    a first protrusion electrode disposed at an inner end of the first spiral electrode and extending in a direction substantially perpendicular to the plane; and
    a second protrusion electrode disposed at an inner end of the second spiral electrode and extending in a direction substantially perpendicular to the plane; wherein
the first protrusion electrode and the second protrusion electrode define opposite end electrodes of the coil electrode section;
the magnetic layer section sandwiches the coil electrode section and is disposed such that the first protrusion electrode and the second protrusion electrode are exposed at and extend from a main surface of the magnetic layer section that extends substantially parallel to the plane in which the first and second spiral electrodes lie;
the magnetic layer section includes a first magnetic layer and a second magnetic layer, the first magnetic layer and the second magnetic layer being arranged to sandwich the first spiral electrode, the second spiral electrode, and the connection electrode from directions substantially perpendicular to the plane in which the first and second spiral electrodes lie;
the first magnetic layer includes a through hole arranged such that each of the first and second protrusion electrodes pass therethrough;
the second magnetic layer includes a depression arranged to accommodate the first spiral electrode, the second spiral electrode, and the connection electrode;
the second magnetic layer includes a projection at a central region of winding of each of the first spiral electrode and the second spiral electrode, the projection having a height at which the projection is in contact with or adjacent to the first magnetic layer;
when a central three-dimensional region includes the projection, a first three-dimensional region in which a plane region of the projection virtually extends along a length in a thickness direction of the first magnetic layer, and a second three-dimensional region in which the plane region of the projection virtually extends along a length in a thickness direction of the second magnetic layer exclusive of the projection, the following relationship is satisfied:

$$0.1 < Sv/Sh < 0.65$$

where Sv is an area of a side surface of the magnetic layer section that is substantially parallel with the thickness direction and crossing the first magnetic layer or the second magnetic layer exclusive of the projection in the central three-dimensional region, a location of the side surface of the magnetic layer section corresponding to a location of the first spiral electrode or the second spiral electrode, and Sh is an area of a cross section along a central cross section in the thickness direction of the first spiral electrode or the second spiral electrode in the central three-dimensional region.

2. The inductor according to claim 1, wherein the magnetic layer section is made of a mixture of magnetic powder and insulating resin.

3. The inductor according to claim 1, wherein each of the first spiral electrode, the second spiral electrode, and the connection electrode is a member that has been punched from a single metal plate.

4. The inductor according to claim 1, wherein the coil electrode section further includes at least one other protrusion electrode that extends in substantially the same direction as the first protrusion electrode and the second protrusion electrode.

5. The inductor according to claim 4, wherein, when the coil electrode section is a member that has been punched from a metal plate, all of the first protrusion electrode, the second protrusion electrode, and the at least one other protrusion electrode is provided by a further bending process.

6. The inductor according to claim 1, wherein the magnetic layer section is provided with a reinforcement disposed on an outer surface thereof, the reinforcement being arranged to reinforce at least the first protrusion electrode and the second protrusion electrode.

7. The inductor according to claim 5, wherein all of the first protrusion electrode, the second protrusion electrode, and the at least one other protrusion electrode is subjected to a deforming process for making a non-planar shape between the punching process and the further bending process.

8. The inductor according to claim 1, wherein the magnetic layer section further includes a magnetic protrusion arranged to protrude in substantially the same direction as the first protrusion electrode and the second protrusion electrode.

9. The inductor according to claim 1, wherein the magnetic layer section has a substantially flat surface disposed opposite to a surface through which the first protrusion electrode and the second protrusion electrode are exposed.

* * * * *